(12) United States Patent
Huang et al.

(10) Patent No.: US 9,401,901 B2
(45) Date of Patent: Jul. 26, 2016

(54) SELF-CONFIGURING WIRELESS NETWORK

(71) Applicant: MivaLife Mobile Technology, Inc., George Town (KY)

(72) Inventors: Longgang Huang, San Jose, CA (US); Kuochun Lee, Fremont, CA (US); Keqin Gu, Fremont, CA (US); Chengrong Lu, Fremont, CA (US); Tsungyen Chen, Palo Alto, CA (US); Qiang Xie, Wuhan (CN); Jingui Zhang, Wuhan (CN)

(73) Assignee: MivaLife Mobile Technology, Inc., Grand Cayman (KY)

( * ) Notice: Subject to any disclaimer, the term of this patent is extended or adjusted under 35 U.S.C. 154(b) by 286 days.

(21) Appl. No.: 13/719,159

(22) Filed: Dec. 18, 2012

(65) Prior Publication Data

US 2014/0053246 A1 Feb. 20, 2014

Related U.S. Application Data

(63) Continuation of application No. PCT/CN2012/080203, filed on Aug. 16, 2012.

(51) Int. Cl.
*H04L 29/06* (2006.01)
*H04W 12/04* (2009.01)
*H04W 84/12* (2009.01)

(52) U.S. Cl.
CPC .............. *H04L 63/06* (2013.01); *H04L 63/062* (2013.01); *H04W 12/04* (2013.01); *H04W 84/12* (2013.01)

(58) Field of Classification Search
CPC ..... H04L 63/06; H04L 63/062; H04W 12/04; H04W 84/12
USPC ............................................. 726/4; 380/278
See application file for complete search history.

(56) References Cited

U.S. PATENT DOCUMENTS

| | | | | |
|---|---|---|---|---|
| 8,280,349 B2 * | 10/2012 | Ishikawa et al. | ............... | 455/410 |
| 8,619,674 B1 * | 12/2013 | Shipley | .................. | H04W 4/00 |
| | | | | 370/328 |
| 2003/0095663 A1 * | 5/2003 | Nelson | .................... | H04L 9/083 |
| | | | | 380/270 |
| 2004/0123126 A1 * | 6/2004 | Lee | ............................. | 713/193 |
| 2004/0160908 A1 * | 8/2004 | Perlman | ....................... | 370/328 |
| 2004/0264700 A1 * | 12/2004 | Kirkland | ....................... | 380/270 |

(Continued)

FOREIGN PATENT DOCUMENTS

| | | |
|---|---|---|
| CN | 101167328 | 4/2008 |
| CN | 102547695 | 7/2012 |
| WO | WO 2012/030733 | 3/2012 |

OTHER PUBLICATIONS

Authorized officer Guohui Sun, International Search Report and Written Opinion in PCT/CN2012/080203, mailed May 23, 2013, 12 pages.

*Primary Examiner* — Matthew Henning

(74) *Attorney, Agent, or Firm* — Fish & Richardson P.C.

(57) ABSTRACT

Methods, systems, and apparatus, are provided for wireless networking. In some implementations, a self-configuring wireless system includes at least one wireless network device; and an access point device; wherein the access point device and the at least one wireless network device are preconfigured with a common key so as to enable the access point device to establish a secure wireless network with the at least one network device using the common key upon powering up the access point device and the at least one wireless network device at a user site.

23 Claims, 9 Drawing Sheets

(56) References Cited

U.S. PATENT DOCUMENTS

| | | | |
|---|---|---|---|
| 2007/0203839 A1* | 8/2007 | Terauchi et al. | 705/51 |
| 2008/0005262 A1* | 1/2008 | Wurzburg et al. | 709/217 |
| 2011/0019826 A1* | 1/2011 | Browning et al. | 380/283 |
| 2011/0142230 A1* | 6/2011 | Zuili | 380/28 |
| 2011/0299684 A1* | 12/2011 | Young | 380/264 |
| 2012/0239923 A1* | 9/2012 | Karl | H04L 41/0806 713/153 |
| 2012/0324218 A1* | 12/2012 | Duren et al. | 713/158 |

* cited by examiner

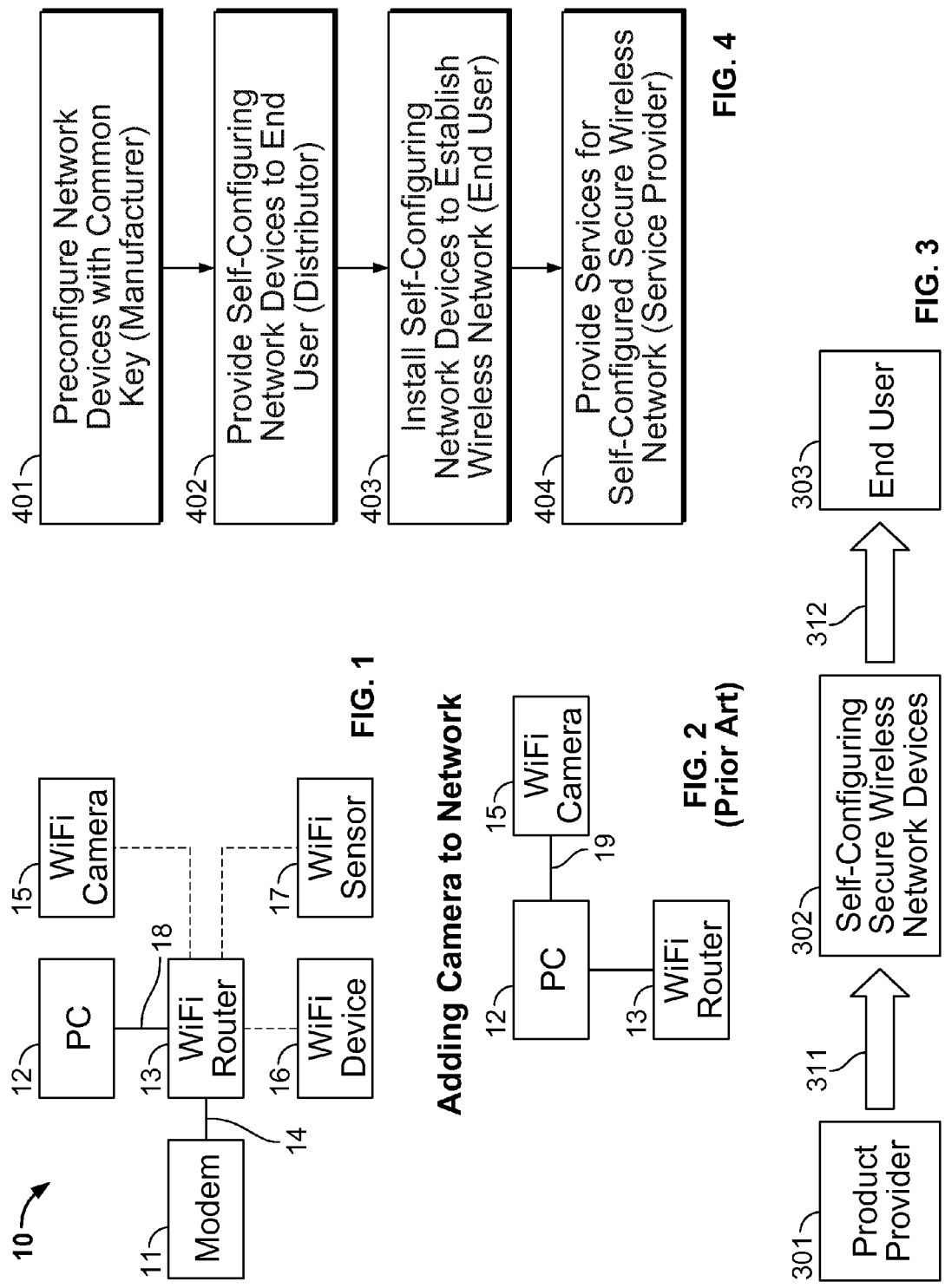

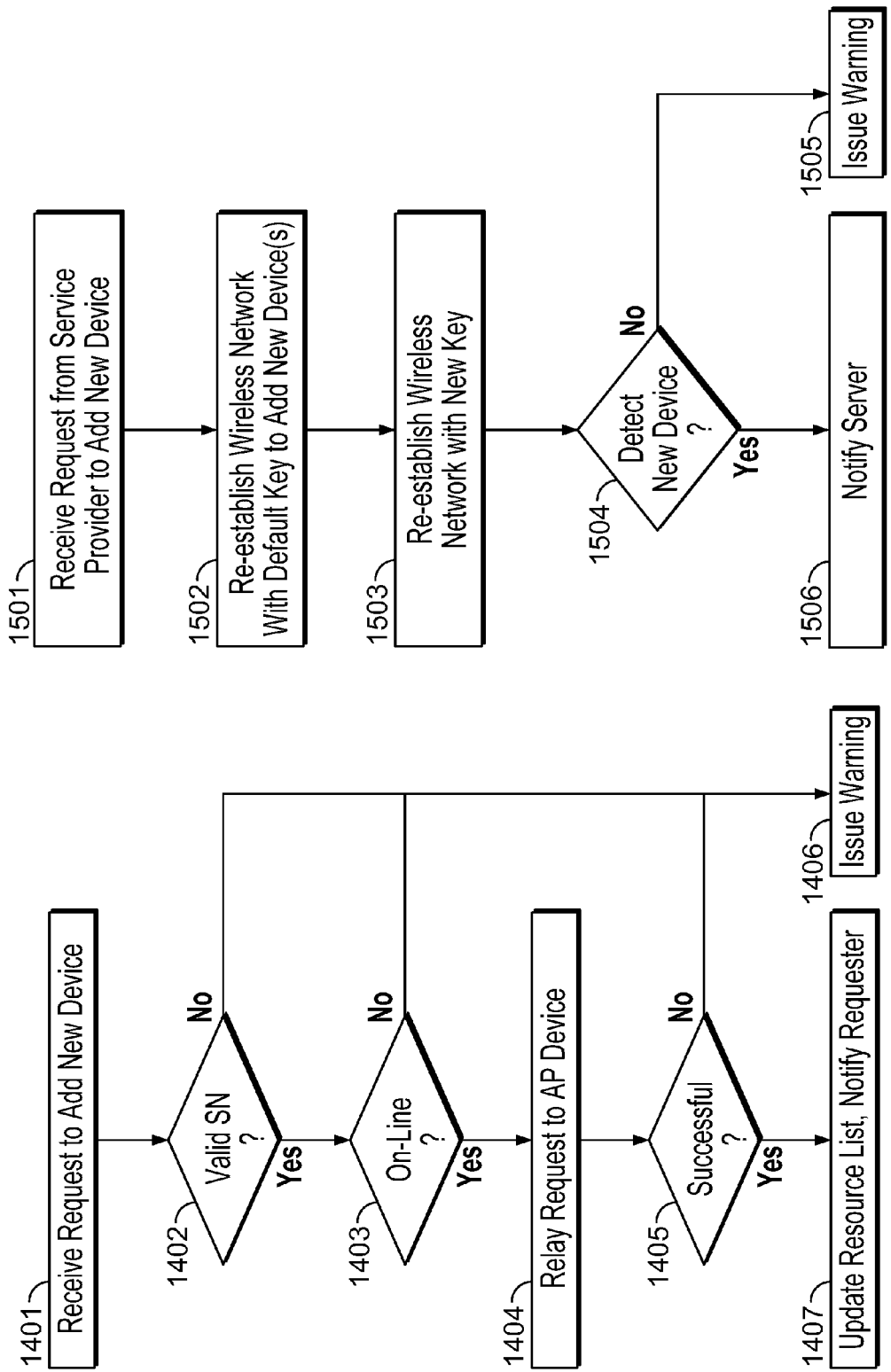

SELF-CONFIGURING WIRELESS NETWORK

CROSS-REFERENCE TO RELATED APPLICATIONS

This application is a continuation application of and claims priority to International Application Serial No. PCT/CN2012/080203, filed on Aug. 16, 2012, the disclosure of which is hereby incorporated by reference.

FIELD OF THE INVENTION

The present specification generally relates to secure wireless network systems and in particular, to a self-configuring secure wireless network.

BACKGROUND OF THE INVENTION

Wireless networks are typically advantageous over their wired counterparts, because they eliminate the need for stringing lengths of wire around a network site. This is especially useful in a home or enterprise security system in which multiple surveillance cameras and various sensors may be strategically placed around, both inside and outside, the home or office. Wireless networks further have the advantage that they cannot be easily circumvented by merely cutting the wired connections to network devices.

FIG. 1 illustrates, as an example, a block diagram of a wireless (e.g., WiFi) network 10 as commonly found in homes. A modem 11 is adapted to access the Internet through a broadband Internet Service Provider (ISP). A WiFi router 13 is wire-connected (indicated by solid line) to the modem 11 through an Ethernet cable 14. Alternatively, a device combining the functions of the modem 11 and the WiFi router 13 may be used. A computer 12 may be wire-connected to the WiFi router 13 through another Ethernet cable 18. WiFi enabled devices are wirelessly connected (indicated by dotted lines) to the WiFi router 13 using, for example, the IEEE 802.11 standard for WiFi communications. Examples of such WiFi enabled devices include continuously connected devices such as a WiFi enabled camera 15 and a WiFi enabled sensor 17. A general WiFi enabled device 16 is also shown which may be a continuously connected device, such as a WiFi enabled printer, or a temporarily connected device such as a laptop computer, tablet computer, or mobile phone.

Many WiFi enabled devices such as a laptop computer, tablet computer, or mobile phone, provide a user interface in the form of a display and keypad so that connecting these devices to an established WiFi network is reasonably easy as long as the user has the WiFi key readily available. In particular, the user interface provides means for a user to select an available WiFi network to connect to and means for the user to enter a WiFi key (also referred to as a network password) to access the selected WiFi network. The WiFi key may be generated according to either Wired Equivalent Privacy (WEP) or WiFi Protected Access (WPA). However, some WiFi enabled devices do not have such a user interface. Adding these WiFi enabled devices to an established WiFi network is a much more challenging task. Many less experienced end users may find it too challenging and eventually return such WiFi enabled devices back to their point of purchase in frustration after multiple unsatisfactory attempts to make a workable connection.

FIG. 2 illustrates, as an example, a block diagram of wired-connections that may be used for adding the WiFi enabled camera 15 to the WiFi network 10. In this example, the WiFi enabled camera 15 does not have a user interface which would allow a user to directly input the WiFi key. Therefore, the WiFi enabled camera 15 is temporarily wire-connected to the computer 12 using an Ethernet cable 19 so that the user may use the computer's display and keyboard to provide the WiFi key to the WiFi enabled camera 15.

However, providing the WiFi key to the camera 15 is not necessarily a straightforward process. To do this, the user may need to first reset the computer 12 to a new IP address, such as 192.168.0.10, that is within the same subnet as camera 15. The user would then open a browser on the computer 12 and go to IP address 192.168.0.1. The user may then select the WiFi access point and input the WiFi key using the computer 12. After providing the WiFi key to the WiFi enabled camera 15, the user may disconnect the wired-connection between the camera 15 and computer 12 and change the computer IP address back to its original IP address.

As a simpler alternative to the approach described above, the WiFi enabled camera 15 may be temporarily wire-connected to the WiFi router 13 instead of the computer 12. In this alternative conventional approach, special installation software, which will simplify the camera installation procedure, is installed on the computer 12. After the WiFi enabled camera 15 is installed or connected to the WiFi network 10, the wire-connection between the WiFi enabled camera 15 and the WiFi router 13 is removed. Although simpler than the first approach described above, this approach still requires the use of an Ethernet cable, which not only adds to the cost and inconvenience of the installation, but may be problematic when the WiFi enabled camera 15 has already been physically mounted in a location that is not easily accessible and distant from the computer 12 and/or WiFi router 13. This may often be the case when the WiFi enabled camera 15 is to be used for surveillance purposes in a home security system.

As a still simpler alternative to the approaches described above, the WiFi Protective Setup (WPS) is a computing standard that attempts to allow easy establishment of a WiFi network. A conventional method using the standard is a push-button method in which the user clicks a button on both the WiFi router 13 and the WiFi enabled device within a certain period of time. The WiFi router 13 would then pass the WiFi key to the WiFi enabled device and add the device to the WiFi network 10. Although simple to use and implement, WPS has been shown to be vulnerable to brute-force attacks. A major security flaw has also been revealed that allows a remote attacker to recover the WiFi key. As a result, users have been urged to turn off the WPS feature on their WiFi routers.

Even if the user is able to properly perform one of the above procedures, the addition of a new WiFi enabled device to the WiFi network may still be thwarted if the user forgets the WiFi key. Keeping track of the WiFi key may be even more difficult if, for security reasons, the WiFi key is periodically changed. Because of this record keeping problem, users are hesitant to change the WiFi key as recommended for security reasons. As a consequence, the WiFi network is more vulnerable to a remote attacker of the network.

SUMMARY OF THE INVENTION

Accordingly, in some implementations a set of self-configuring secure wireless network devices are provided that automatically establish a secure wireless network when powered up.

In some implementations, a secure wireless network is provided that easily accommodates the addition of new wireless enabled devices lacking user interfaces to an established secure wireless network.

In some implementations, a secure wireless network is provided that does not require an end user to have knowledge of its wireless key to add new wireless enabled devices to the network.

In some implementations, a system is provided that includes a secure wireless network that automatically updates its wireless key periodically to enhance system security.

These and other implementations are accomplished by the various aspects of the present invention. In general, one innovative aspect of the subject matter described in this specification can be embodied in a system that includes at least one wireless enabled device; and an access point device; wherein the access point device and the at least one wireless enabled device are preconfigured with a common key so as to enable the access point device to establish a secure wireless network with the at least one network device using the common key upon powering up the access point device and the at least one wireless network device at a user site.

The foregoing and other aspects can each optionally include one or more of the following features, alone or in combination. The access point device is configured to automatically establish communication with a remote service provider device. The access point device is configured to update the at least one wireless network device with a first new key, and re-establish the wireless network using the first new key. The first new key is received from a remote service provider device, the first new key uniquely identifying a user and derived using one or more unique user identifiers, the user identifiers including one or more of a user telephone number, address, email address, social security number, driver's license number, or credit card number. The access point device is configured to generate the first new key using a unique identifier of the access point device. The access point device is configured to receive a second new key after previously receiving the first new key and to share the second new key with the at least one wireless network device so that the second new key is usable instead of the first new key to establish the wireless network. A new wireless network device is preconfigured with the common key, and wherein the access point device is configured to receive an indication to add the new wireless network device to an established wireless network by: re-establishing the wireless network using the common key to add the new wireless network device to the re-established wireless network; sharing the first new key with at least the new wireless network device; and re-establishing the wireless network using the first new key. The access point device is preconfigured to be in bridge mode and to assign one or more addresses to each at least one wireless network device. The common key uniquely identifies a user. The common key is a default key. The access point device is configured to communicate with the at least one wireless network device using one of a WiFi, Bluetooth, Z-Wave, ZigBee, and 433 mhz RF wireless network protocol.

Another aspect is a service provider system comprising: an Internet gateway for accessing the Internet; and a server computer configured to establish a connection through the Internet with an access point device, receive a request from an authorized device to add a new wireless network device to a wireless network established by the access point device, and transmit an instruction to the access point device to re-establish the wireless network to include the new wireless network device.

The foregoing and other aspects can each optionally include one or more of the following features, alone or in combination. The server computer is configured to determine the authority of the authorized device from a list of authorized devices associated with the access point device. The server computer is configured to transmit a new key to the access point device, wherein the new key is used by the access point device to re-establish the wireless network using the new key instead of a previously used key. The server computer is configured to periodically transmit a new key to the access point device, wherein the new key is used by the access point device to re-establish the wireless network using the new key instead of a previously used key. The server computer is configured to periodically generate the new key by using one of a random number Another aspect is a service provider system comprising: an Internet gateway for accessing the Internet; and a server computer configured to establish a connection through the Internet with an access point device, generate a first new key derived from information of a user associated with the access point device, and transmit the first new key to the access point device so that the access point device may re-establish a wireless network using the new key.

The foregoing and other aspects can each optionally include one or more of the following features, alone or in combination. The server computer is configured to periodically generate a second new key derived from information of the user associated with the access point device and transmit the second new key to the access point device so that the access point device may re-establish a secure wireless network using the second new key. The second key is generated using unique user information including one or more unique user identifiers, the user identifiers including one or more of a user telephone number, address, email address, social security number, driver's license number, or credit card number. The one or more unique user identifiers are obtained from a user account associated with the wireless network.

Another aspect is an access point device for a secure wireless network, the access point device comprising: a memory for storing a configuration file; and a controller configured to periodically generate a first new key, store the first new key in the configuration file, share the first new key with wireless enabled network devices connected to the wireless network, and re-establish the wireless network using the first new key.

The foregoing and other aspects can each optionally include one or more of the following features, alone or in combination. The access point device further includes communication interface logic coupled to the controller so that the controller is capable of communicating with the wireless network devices using at least one of a WiFi, Bluetooth, Z-Wave, ZigBee, and 433 mhz RF wireless network protocol. The access point device further includes communication interface logic coupling to the controller to an Internet gateway, wherein the controller is configured to send the first new key to a server through the Internet gateway for storing on a memory of the server.

Another aspect is a method for preconfiguring a secure wireless network, the method comprising: programming an access point device and at least one wireless enabled device with a common key so as to enable the access point device to establish a self-configuring wireless network using the common key upon powering up the access point device and the at least one wireless enabled device at a user site.

The foregoing and other aspects can each optionally include one or more of the following features, alone or in combination. The method further includes reconfiguring the access point device to be in access point mode; and disabling a Dynamic Host Configuration Protocol (DHCP) server of the access point device. The common key uniquely identifies a user of the wireless network.

Another aspect is a method for adding a new wireless enabled device to a self-configuring wireless network established using a new key, the method comprising: receiving a request to add the new wireless enabled device to the wireless network wherein the new wireless enabled device is preprogramed with a default key; re-establishing the wireless network using the default key to add the new wireless enabled device to the re-established wireless network; sharing the new key with the new wireless enabled device; and re-establishing the wireless network using the new key.

Still another aspect is a method for automatically updating a new key to be used for establishing a wireless network, the method comprising: generating the new key so as to be derived from information of a user associated with an access point device; and transmitting the new key to the access point device so that the access point device may re-establish a wireless network using the new key.

Yet another aspect is a method for automatically updating a new key to be used for establishing a wireless network, the method comprising: periodically generating a different new key; storing the different new key in a configuration file; sharing the different new key with wireless enabled network devices connected to the wireless network; and re-establishing the wireless network using the different new key.

Yet another aspect is a method for providing a plurality of wireless network devices to an end user such that the plurality of wireless network devices are easily installable into a wireless network by the user, the method comprising: preconfiguring the plurality of wireless network devices with a common key that is used for establishing the wireless network; and providing the preconfigured plurality of wireless network devices to the end user.

Another aspect is a system comprising: an access point device; a first extending device; and one or more wireless network devices, wherein the access point device, the first extending device, and the one or more wireless network devices each include a common key so as to enable the access point device to establish a secure wireless network with the one or more network devices through the first extending device using the common key upon powering up the access point device, the first extending device, and the one or more wireless network devices at a user site.

The foregoing and other aspects can each optionally include one or more of the following features, alone or in combination. The first extending device is a wireless repeater or bridge device. The first extending device allows each of the one or more wireless network devices to communicate with the access point device. The access point device is configured to update the one or more wireless network devices and the first extending device with a first new key, and re-establish the wireless network using the first new key. The first new key is received from a remote service provider device, the first new key uniquely identifying a user and derived using one or more unique user identifiers, the user identifiers including one or more of a user telephone number, address, email address, social security number, driver's license number, or credit card number. The access point device is configured to generate the first new key using a unique identifier of the access point device. The access point device is configured to receive a second new key after previously receiving the first new key and to share the second new key with the one or more wireless network devices and the first extending device so that the second new key is usable instead of the first new key to establish the wireless network. The system further includes one or more additional wireless network devices positioned such that they can directly communicate with the access point device. The system further includes a second extending device, wherein the first extending device and the second extending device extend a range of the access point device.

Additional implementations, features, and advantages of the various aspects of the present invention will become apparent from the following description of its preferred embodiment, which description should be taken in conjunction with the accompanying drawings.

BRIEF DESCRIPTION OF THE DRAWINGS

FIG. 1 illustrates a block diagram of a conventional secure WiFi network.

FIG. 2 illustrates a block diagram of wired-connections conventionally used for adding a WiFi enabled camera to a secure WiFi network.

FIG. 3 illustrates a schematic diagram depicting an example of how self-configuring secure wireless network devices are generated by a product provider and provided to an end user using a method utilizing aspects of the present invention.

FIG. 4 illustrates a schematic diagram depicting example actions performed by different entities for making, distributing, installing, and maintaining a self-configuring secure wireless network utilizing aspects of the present invention.

FIG. 14 illustrates an example series of actions performed by a service provider server in response to a request to add a new wireless enabled device to an established secure wireless network in a system utilizing aspects of the present invention.

FIG. 15 illustrates an example series of actions performed by an access point device to add a new wireless enabled device to an established secure wireless network in a system utilizing aspects of the present invention.

DETAILED DESCRIPTION

Figure 5:
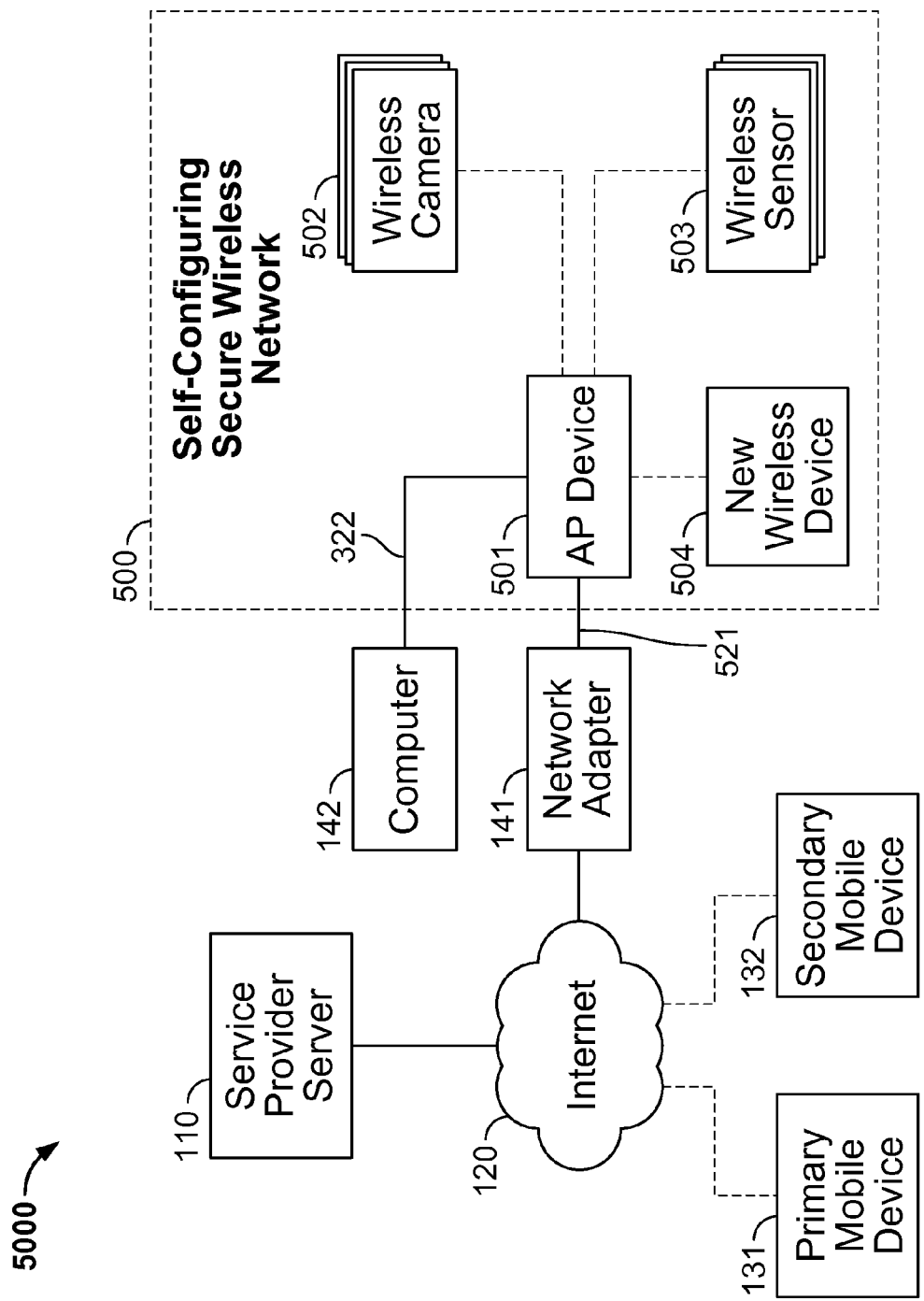
FIG. 5 illustrates a block diagram of an example system including a self-configuring secure wireless network with AP device as router, utilizing aspects of the present invention.

Although a home security system is used as an example in this detailed description, it is to be appreciated that the various aspects of the present invention are not to be limited to such a system and are generally applicable to any type of secure wireless network in which wireless enabled devices to be added to the network lack user interfaces for a user to enter a wireless key during the device installation process. Other examples of networks in which wireless enabled devices lack user interfaces may include extra-home security networks, e.g. an automobile security network, office security network, or storage facility security network, office networks, hospital or clinic networks, or classroom networks.

Initial set up of a secure wireless network is especially cumbersome when many of the wireless enabled devices to be included in the network lack user interfaces for entering a wireless key during the device installation process. As an example, a home surveillance system may include many wireless enabled cameras and numerous wireless enabled sensors that lack user interfaces to facilitate their addition to the home network.

To vastly simplify the end user's task of setting up a secure wireless network, a self-configuring secure wireless network is described herein that automatically establishes the secure wireless network upon power-up with little or no user interaction. To facilitate such a plug-and-play resembling feature, an access point device and one or more wireless enabled devices to be included in the secure wireless network, are preprogrammed with a common Service Set Identifier (SSID) and common key that is used for establishing the secure wireless network. The common key may be a unique key which is associated with a user of the secure wireless network. Alternatively, the common key may be a default key that is the same for all access point devices and wireless enabled devices manufactured or distributed by a common source. Since the common SSID and common key are preprogrammed into the access point device and the wireless enabled devices, the access point device can automatically establish the secure wireless network upon power-up without further intervention by, and transparently to, the user.

As an example of a common key which is uniquely associated with a user, the common key may be derived from a number uniquely identifying the user such as a phone number, email address, postal address, social security number, driver's license number, credit card number, etc. For security reasons, the common key may be generated using a pseudo-random number generator or other encryption algorithm. A number uniquely identifying the user may be provided as a seed to the generator. The resulting key may be generated as a WEP or WPA key. A record of the common key generated in this manner may then be kept for each user by the manufacturer and/or distributor of the self-configuring secure wireless network and provided to the user along with the self-configuring secure wireless network.

A software agent is provided in the access point device so that its controller automatically establishes a connection with a remote server when the access point device is connected to an Internet gateway and powered up. When the remote server is a service provider server, it is to be appreciated that the service provider server may also be connected to many other access point devices and their corresponding secure wireless networks, such as in the case of a home security service being connected to the many home security systems of its subscribers. The remote server may then request the controller to perform numerous tasks including updating the wireless key from the common key to a new key or from the new key to a newer key, transmitting data from wireless enabled network devices to authorized devices requesting such data, and adding new wireless enabled network devices to an established secure wireless network. Each key can be distinct from each other key. The access point device may be configured as an intelligent router or bridge. In addition to the controller, the access point device includes memory for storing information such as the common key, program code for the software agent, and other items described herein.

The access point device includes interface logic, such as a transmitter and receiver, for communicating with the wireless devices on the secure wireless network. The interface logic may be integrated into the access point device or attached to it in the form of a dongle. Supported wireless technologies include WiFi, Bluetooth, Z-Wave, ZigBee, 433 MHz RF, and other Radio Frequency (RF) technologies. Although the current examples described herein may refer to WiFi devices, it is to be appreciated that various aspects of the present invention are also applicable to other RF technologies as well. Further, the access point devices described herein may communicate with multiple wireless technologies in a given configuration. In such cases, a single common key used for all RF technologies may be used or a different common key for each RF technology may be used. A data packaging module may also be included in the access point device to packetize and transmit data received from devices operating under different wireless technologies to the remote server.

FIG. 3 illustrates, as an example, a schematic diagram of self-configuring secure wireless network devices 302 being generated by a product provider 301 using a process 311 (as described elsewhere herein) and being provided to an end user 303 through a distribution channel 312. In this example, the product provider may be either the manufacturer of the wireless enabled network devices, a Value Added Reseller (VAR), or a distributor of the wireless enabled network devices.

FIG. 4 illustrates, a schematic diagram depicting example actions performed by different entities for making, distributing, installing, and servicing a self-configuring wireless network. In particular, in block 401, a manufacturer or VAR preconfigures the network devices with a common key (as described elsewhere herein). In block 402, a distributor provides the self-configuring network devices to an end user. The distributor may be a party that buys, or takes on consignment, the self-configuring network devices to sale them to end users. Alternatively, the distributor may be the manufacturer or the VAR, who in this case, commercially distributes the self-configuring network devices directly to end users. In block 403, the end user installs the self-configuring network devices (as described elsewhere herein) to establish a secure wireless network at the end user's site. In block 404, a service provider provides various services related to the established secure wireless network (as described elsewhere herein).

FIGS. 5-15 provide additional details on the self-configuring secure wireless network and its use within a home security system. Resources in the home security system may be accessed and managed through a server of a service provider by the user and other authorized parties using pre-authorized devices such as laptop computers, desktop computers, tablet computers, and mobile phones. Access may also be provided through any Internet connected device which may become an authorized device using a conventional user name and password procedure with the service provider server.

FIG. 5 illustrates an example block diagram of a system 5000 including a self-configuring secure wireless network 500, which is connected through the Internet 120 to a service provider server 110. The self-configuring secure wireless network 500 includes an Access Point (AP) device 501 and wireless enabled devices 502, 503 which have been preprogrammed with a common key so that upon powering up the devices, the AP device 501 establishes a secure wireless network using the common key. "Preprogrammed" in this sense means the common key has been retrievably stored in a memory of the device.

In a typical home security system, several strategically positioned cameras 502 and sensors 503 may be included. In addition to sensors included for security purposes such as movement and displacement sensors, for example, detecting the opening of doors and windows, other sensors providing other useful information may be included such as doorbell sensors, smoke detector alarm sensors, temperature sensors, and/or environmental control sensors and/or controls. An additional wireless device 504 is also shown, which has been subsequently added to the secure wireless network 500 after the installation of the secure wireless network 500 in the home security system. Hence, it is referred to as being a "new" wireless device. Similar to the wireless enabled devices 502, 503, the new wireless device 504 has also been preprogrammed with the common key so that it too can provide for self-configuration of the secure wireless network 500.

In this example, the Access Point (AP) device 501 is the only router in the home security system. Therefore, all devices that are to be networked must be connected to the AP device 501. To this end, the AP device 501 preferably includes at least one of an Ethernet receptacle or Universal Serial Bus (USB) receptacle so that various devices such as computer 142 may be wire-connected to it, such as through an Ethernet connection 522. The AP device 501 in this case is configured to be in "router" mode. Hence, it is referred to as being a router access point device.

The AP device 501 is wire-connected, such as through an Ethernet connection 521, to a network adapter 141, e.g., a modem or directly to the Internet through an ISP. Preferably, a broadband connection is used for high speed transmission of video data from the wireless camera 502 and sensor data from the wireless sensor 503. The AP device 501 includes a Dynamic Host Configuration Protocol (DHCP) server which is enabled in this case so that it may assign IP subaddresses to devices connecting through the AP device 501 to the Internet 120.

As previously explained, the AP device 501 has a software agent residing in it that automatically establishes a connection with a remote service provider server 110 upon the AP device 501 being powered up and after it has been connected to the Internet 120 through the modem 141, which serves as an Internet gateway. The service provider server 110 interacts with the AP device 501 and authorized devices, such as primary and secondary mobile devices 131, 132, to perform various functions and/or services as described herein.

The mobile devices 131, 132 preferably also have software agents or resident applications for such interaction with the service provider server 110. Devices that are attempting to interact with the service provider server 110 may confirm their authority to the service provider server 110, for example by providing information that uniquely identifies the requesting device, such as an Internet Protocol (IP) address, a product serial number, or a cell phone number. Alternatively, they may provide a user name and password which are authorized to interact with the self-configuring secure wireless network 500. To facilitate such authorization procedures, the service provider server 110 stores or has ready access to such authorization information for each self-configuring secure wireless network of users who subscribe to the service.

Figure 6:
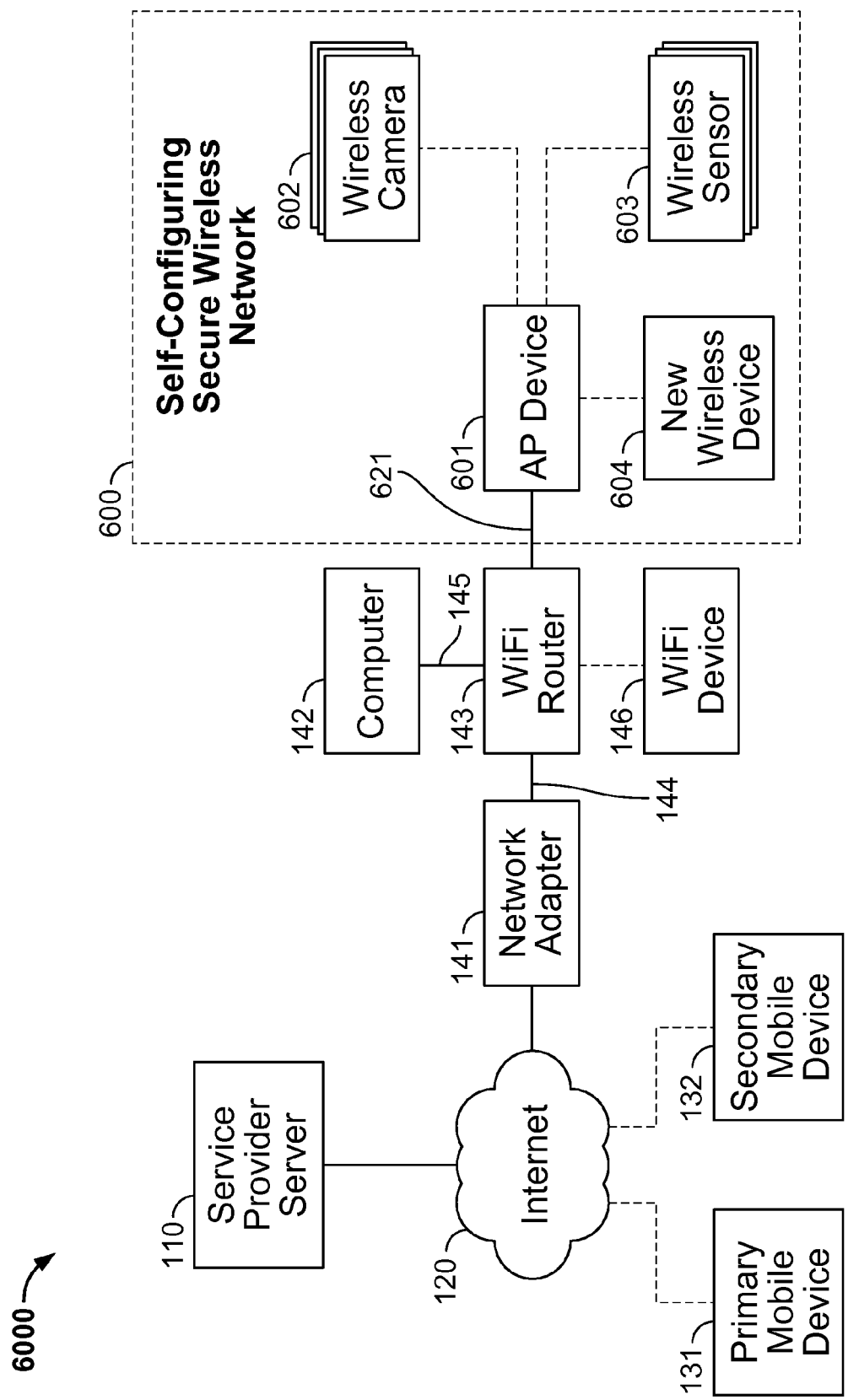
FIG. 6 illustrates a block diagram of an example system including a self-configuring secure wireless network with AP device configured as a router or a bridge behind another router, utilizing aspects of the present invention.

FIG. 6 illustrates, as an example, a block diagram of a system 6000 including a self-configuring secure wireless network 600 that is connected in an alternative manner through the Internet 120 to the service provider server 110. In this case, the AP device 401 is wire-connected to a WiFi router 143 through an Ethernet connection 621 so that the AP device 601 is only indirectly connected to the modem 141, which is connected to the WiFi router 143 through another Ethernet connection 144. The AP device 601 may be configured as either a router access point device or a bridge access point device. The following describes the AP device 601 when configured as a bridge access point device.

When the AP device 601 is configured as a bridge access point device, the Access Point mode for the AP device 601 is enabled. Under this configuration, only one subnetwork is present. Also, all devices in the self-configuring secure wireless network 600 are preprogrammed with a common SSID and common key, such as in the case of the self-configuring secure wireless network 500. However, since the WiFi router 143 has a DHCP server, the DHCP server of the AP device 601 is disabled so that the DHCP server of the WiFi router 143 may assign private IP addresses to all devices connecting through the AP device 601 to the WiFi router 143. The AP device 601 may be configured, e.g., by a seller or manufacturer, to allow its Internet Protocol (IP) address to be dynamically assigned by DHCP server of the WiFi router 143 or it may be configured with a statically assigned IP address.

When the AP device 601 is configured as a router access point device, two subnetworks are present. A first subnetwork is the WiFi network established by the WiFi router 143, which includes a WiFi device 146. A computer 142 is wire-connected to the WiFi router 143 using an Ethernet connection 145. A second subnetwork is the secure wireless network established by the AP device 601 which includes wireless enabled devices 602-604. In this case, the DHCP server of the AP device 601 is enabled. The first subnetwork in this case has a different SSID and different key than the second subnetwork. The SSID of the second subnetwork is preprogrammed along with the common key into all devices of the self-configuring secure wireless network 600. For security purposes, the SSID of the second subnetwork is preferably not broadcasted by the AP device 601. Wireless enabled devices 602-604 are configured to only connect to the SSID of the AP device 601. Therefore, they do not need to detect which networks are available to be connected to.

Figure 7:
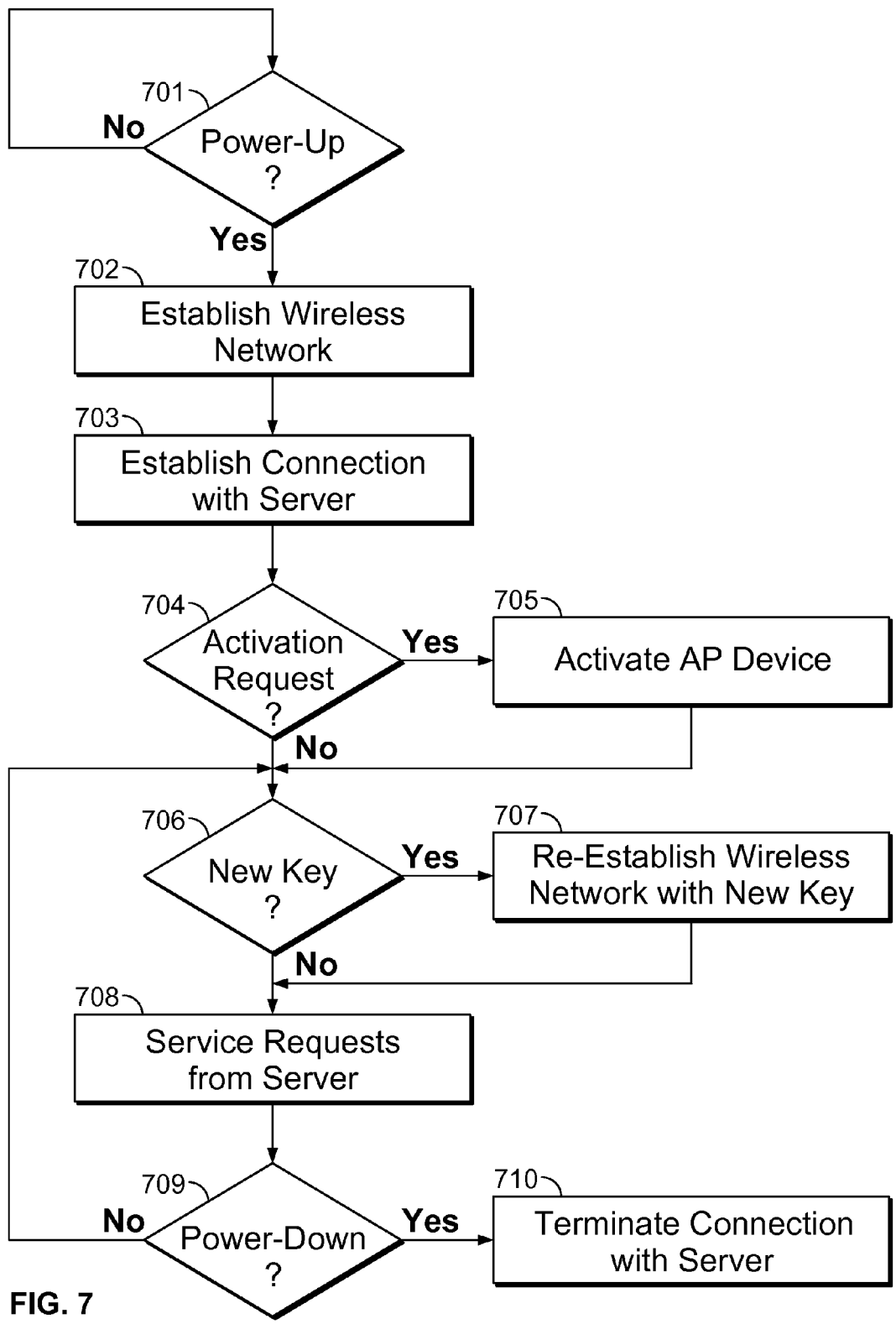
FIG. 7 illustrates an example series of actions performed by an access point device in a secure wireless network included in a system utilizing aspects of the present invention.

FIG. 7 illustrates an example series of actions performed by an AP device (such AP devices 501, 601) in a secure wireless network included in a home security or other system. In block 701, the AP device detects whether it has been powered up using, for example, a power-up detection circuit. Upon being powered up, in block 702, the AP device executes stored program instructions to establish a secure wireless network using either a common key, which has been preprogrammed into the AP device and all other devices as part of a self-configuring wireless network (such as networks 500, 600), or a subsequently provided key which has been stored in a memory of the AP device. In block 703, the AP device then establishes a secure connection with a remote service provider server (such as server 110) through an Internet gateway connected at the time to the AP device. To facilitate such connection, an IP or URL address of the service provider server is programmed into the software agent running on the AP device. To make the transmission secure, the transmission may be encrypted in a conventional manner such as using a public/private key exchange.

In block 704, after establishing a secure Internet connection with the service provider server, the AP device determines whether an activation request has been received from the service provider server. The service provider server issues the activation request if the AP device has not been previously activated with the service provider server. If the determination in block 704 is YES, then in block 705, the AP device performs a self-activation procedure by retrieving and sending its unique product serial number to the service provider server. The service provider server then processes the serial number to activate the AP device.

Figure 8:
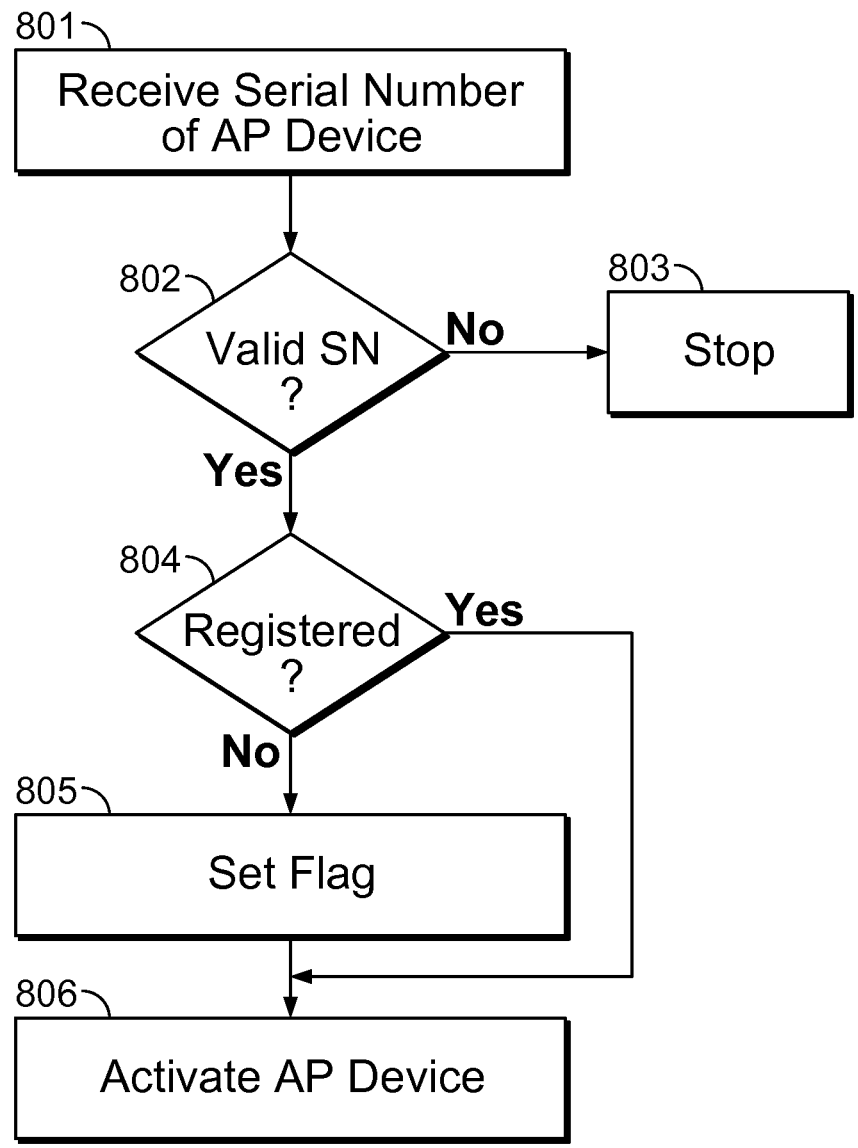
FIG. 8 illustrates an example series of actions performed by a service provider service during self-activation by an access point device in a system utilizing aspects of the present invention.

FIG. 8 illustrates an example series of actions performed by the service provider server to activate the AP device. In block 801, the server receives the serial number from the AP device. In block 802, a determination is made whether the serial number is valid. If the determination in block 802 is NO, then in block 803, the process stops without activation of the AP device. If the determination in block 802 is YES, then in block 804, a determination is made whether the AP device is currently registered with the service provider server. Registration in this case means a database record for the AP device has already been created by the service provider server. If the determination in block 804 is YES, then in block 806, the service provider server activates the AP device by setting a flag in the record which indicates that the previously registered AP device is now activated. On the other hand, if the determination in block 804 is NO, then in block 805, a database record for the AP device is created by including the serial number of the AP device and setting another flag indicating additional registration information is necessary. In block 806, the service provider server activates the AP device as previously described.

Although a self-activation procedure is described above for block 705, the activation and registration of the AP device may instead be initiated and managed using a mobile device such as a smartphone or other authorized device. In this case, a software application is first installed on the mobile device or other authorized device.

Figure 9:
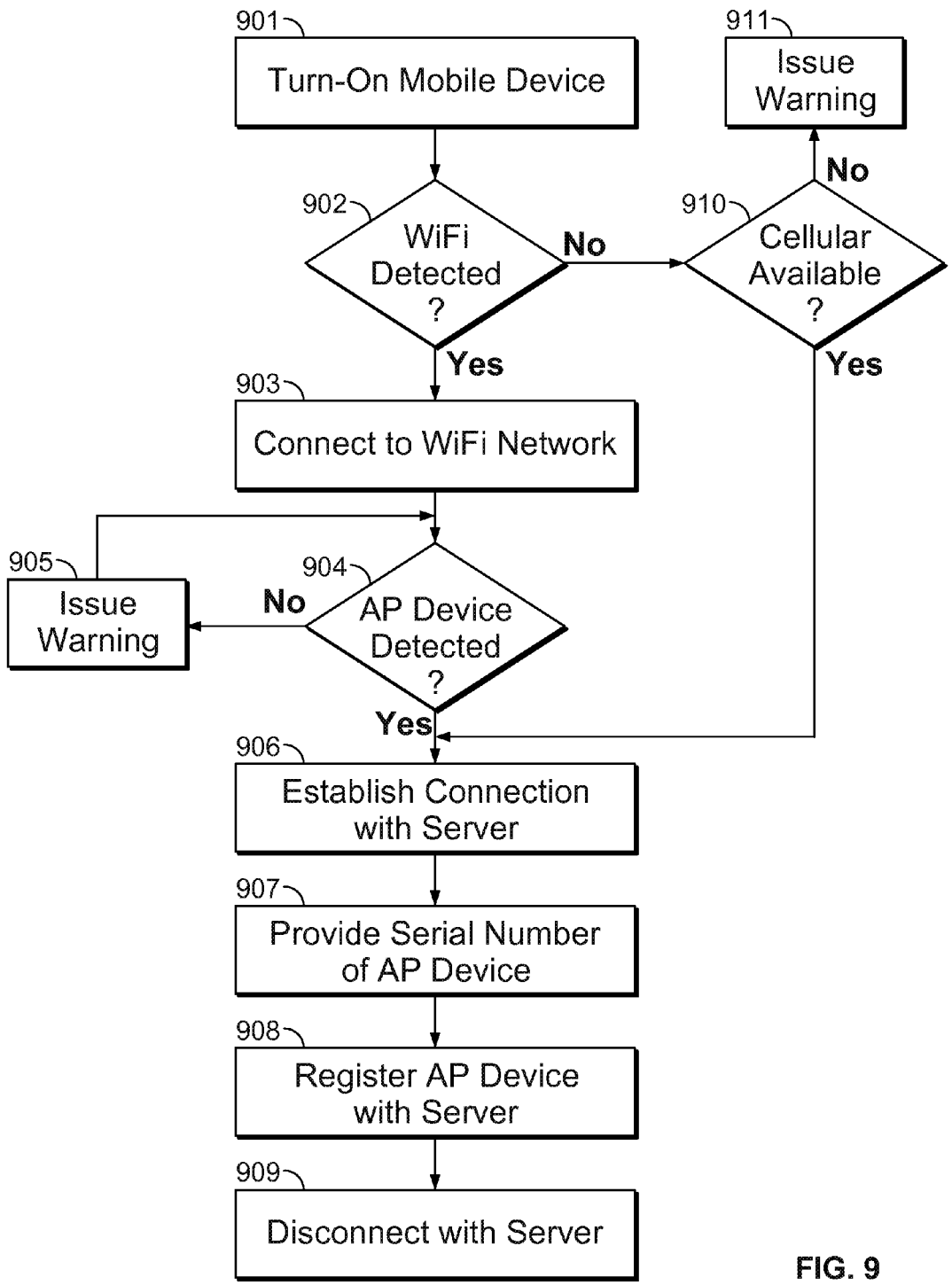
FIG. 9 illustrates an example series of actions performed by a mobile device to activate an access point device of a secure wireless network included in a system utilizing aspects of the present invention.

FIG. 9 illustrates an example series of actions performed by a mobile device to activate the AP device. In block 901, the user turns on the mobile device and in block 902, the mobile device makes a determination of whether the home WiFi network is available for connection. If the determination in block 902 is YES, then the mobile device connects to the home WiFi network in a conventional manner using the password for the home network. An example of such connection is the WiFi device 146 connecting to the WiFi router 143 in FIG. 6. After connecting to the home network, in block 904, the mobile device makes a determination of whether the AP device is detected on the network. If the determination in block 904 is NO, then in block 905, a warning message is issued on a screen of the mobile device to make sure the AP device is wire connected to the home router and turned on. The process then continues to loop through block 904 until a YES determination is made or the software application is terminated by a user of the mobile device.

Once the mobile device detects the AP device is connected to the home network, then in block 906, the mobile device establishes a connection with the service provider server. In block 907, the mobile device provides the serial number of the AP device to the service provider server. The mobile device may do so by its user typing in the serial number or its user using a bar code scanner application to scan in the serial number, for example, from a bar code on the AP device or its packaging. In block 908, the user of the mobile device may then provide registration information to the service provider server such as the user's contact information, e.g., the user's postal address, phone number, and email address, a user name and password, phone numbers of smartphones authorized to access the resources of the secure wireless network through the service provider server, and/or other information identifying and/or defining the authority of a primary and optionally other users of the secure wireless network. As previously explained, the authorized smartphones can be treated as authorized devices when subsequently attempting to access resources of the secure wireless network through the service provider server and the AP device. Other devices may gain such access by their users providing the user name and password.

After completion of the activation and registration of the AP device, the mobile device may terminate its connection with the service provider server in block 909 by, for example, exiting the software application. Control may then be passed back to the AP device to perform block 706 of FIG. 7.

If the determination in block 902 is NO, i.e., the mobile device is unable to connect to the home WiFi network, then in block 910, the mobile device attempts to establish an Internet connection with the service provider server through a cellular telephone service usable by the mobile device (e.g., a 3G or 4G service). If no cellular telephone service is available to the mobile device, then in block 911, an error message is displayed on a screen of the mobile device. On the other hand, if a cellular telephone service is available to the mobile device, then the mobile device performs blocks 906-909 as previously described by using the cellular telephone service instead of the WiFi connection.

As an alternative to using a mobile device for activation and registration of the AP device, a computer connected to the home WiFi network, such as computer 142 in FIGS. 5 and 6, may be used. In this case, a software application is first installed on the computer so that the computer may perform tasks described in reference to blocks 904-909 of FIG. 9 instead of the mobile device.

Referring back to FIG. 7, if the determination in block 704 is NO, then in block 706, the AP device determines whether a new key has either been received from the remote service provider server or is to be generated by the AP device. As previously explained, periodically changing the password or WiFi key for the secure WiFi network is desirable for security reasons. In addition, the common SSID preprogrammed into the AP device may also be periodically changed for security purposes. In this case, the new SSID is shared by the AP device with connected wireless enabled devices in the same manner as the new key so that the secure wireless network may be re-established with the new SSID and new key. Accordingly, wherever updating of the wireless key with a new key is described or claimed herein, it is to be appreciated that optionally updating of the SSID may also be performed in generally the same manner including deriving the new SSID from information uniquely identifying the user or the AP device.

Figure 10:
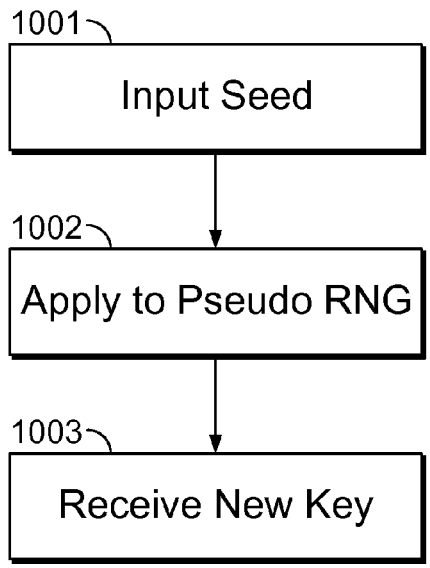
FIG. 10 illustrates an example series of actions performed by either a service provider server or an access point device to generate a new key for a secure wireless network included in a system utilizing aspects of the present invention.

FIG. 10 illustrates an example series of actions performed by either the service provider server or the AP device to generate a new key for the secure wireless network. In block 1001, a seed is provided to a unique key generator such as a pseudo-Random Number Generator (pseudo-RNG). When the new key is being generated by the service provider server, the seed may be derived from any unique customer identification number from information provided, for example, during the registration process.

When the new key is being generated by the AP device, the seed may be derived from its serial number. The seed may be modified in some manner each time a new key is generated, for example, by logically combining the seed with the date or time stamp so that a different seed is used and a different new key is generated. In block 1002, the seed is applied to the pseudo-random number generator. In block 1003, the generated new key is received as output of the pseudo-random number generator. The new key may be a WEP key or WPA key, depending upon the desired level of security for the secure wireless network. When the new key is generated by the service provider server, it may optionally be stored in the database record previously created for the AP device along with a time stamp indicating when the new key was generated.

Referring back to FIG. 7, if the determination in block 706 is YES, then in block 707, the AP device shares the new key with all devices on the secure wireless network and re-establishes the secure wireless network using the new key.

Figure 11:
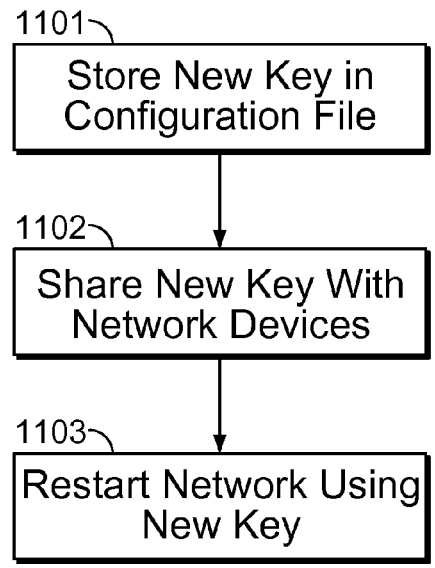
FIG. 11 illustrates an example series of actions performed by an access point device to install a new key for a secure wireless network included in a system utilizing aspects of the present invention.

FIG. 11 illustrates, as an example, tasks performed by the AP device in block 707 to install the new key for the secure wireless network. In block 1101, the AP device stores the new key in a configuration file or other designated location in its memory. If this is the first time a new key has been provided to the AP device, then the AP device may first create the configuration file. Thus, if no configuration file is found on the AP device, then the AP device will establish the secure wireless network using the original common key programmed or otherwise stored on the AP device. In block 1102, the AP device shares the new key with all other WiFi enabled network devices on its secure wireless network. In block 1103, the AP device then restarts the secure wireless network using the new key.

Again referring back to FIG. 7, if the determination in block 706 is NO, then the AP device continually checks to see if a new key is received in block 706 and services any requests received from the remote service provider server in block 708 until a determination is made that the AP device is powered down in block 709. Examples of requests that the AP device may receive from the remote service provider server are described in reference to FIGS. 12-15 as follows. If a power down indication is received by the AP device as determined in block 709, then in block 710, the AP device terminates the connection with the remote service provider server before turning off the secure wireless network.

Figure 12:
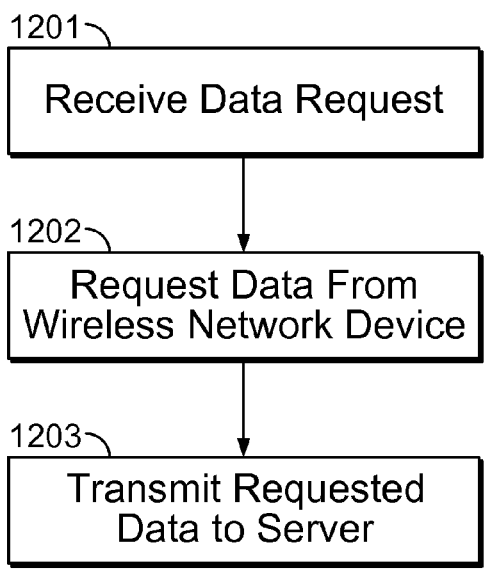
FIG. 12 illustrates an example series of actions performed by an access point device in response to a data request from a service provider server in a system utilizing aspects of the present invention.

FIG. 12 illustrates an example series of actions performed by an AP device in response to a data request from a service provider server in a home security system. In particular, in block 1201, the AP device receives a data request from the service provider server. In block 1202, the AP device routes the data request to the appropriate device (from which the data is being requested) on the secure wireless network. In block 1203, the AP device receives the requested data from the device and transmits the requested data to the service provider server.

The data request may be initiated by either the service provider server, e.g., server 110 in FIGS. 5 and 6, according to a programmed schedule or it may be initiated by an authorized device, e.g., such as mobile devices 131, 132 in FIGS. 5 and 6, or authorized user interacting with the service provider server. As an example of a data request initiated by the service provider server, surveillance video may be periodically requested from one or more of the wireless enabled cameras, such as cameras 502, 602 of FIGS. 5 and 6, and stored in cloud or local storage for later viewing by an authorized user. As another example of a data request initiated by the service provider server, sensor data may be periodically requested from one or more of the wireless enabled sensors, such as sensor 303 of FIGS. 5 and 6, and stored in cloud or local storage as raw data or the sensor data may be processed and stored in cloud or local storage as processed data.

As an example of a data request initiated by an authorized device or user, surveillance video or sensor data from a network device specified by the authorized device may be requested by a user interacting with the service provider server through the authorized device. The request in this case may result from the initiative of the user or it may result from a sensor warning or other indication received by the authorized device through the service provider server. As an example, a doorbell sensor, movement sensor, or displacement sensor, e.g., a sensor which detects a door or window being opened, may initiate a warning that is transmitted to a specified mobile device, such as specified by the cell phone number of the primary end user, through the AP device and service provider server. A video feed or captured still image from the closest surveillance camera on the secure wireless network may then be requested by the user and transmitted to the authorized device. Alternatively, the video feed or captured still image from the closest surveillance camera may be automatically transmitted along with the warning. Additionally, the user of the authorized device may also make a request for such data at any time without prodding from a sensor device.

Although mobile devices are generally described herein as data requesters or device activators, they may also be configured as data providers for the system. For example, application software residing on a mobile device may provide the capability for its camera to serve as an IP camera so that other authorized devices in the system may receive captured pictures or video from the mobile device. As an example of this, a smartphone, such as the primary mobile device 131, which is equipped with such software, can provide captured images and video to authorized devices through the service provider server. Sensor information from mobile devices may also be shared in a similar manner. In this way, the surveillance area may be extended well beyond typical WiFi or other RF technology ranges.

Figure 13:
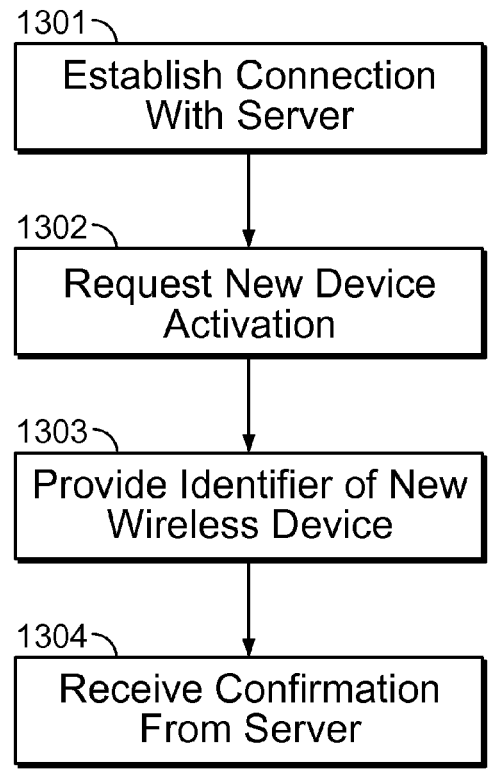
FIG. 13 illustrates an example series of actions performed by a mobile device to add a new wireless enabled device to an established secure wireless network included in a system utilizing aspects of the present invention.

FIGS. 13-15 illustrate, as an example, tasks performed respectively by an authorized device, the service provider server, and the AP device to add a new wireless enabled device to an established wireless connection. In this example, the new wireless enabled device is a WiFi enabled device which has been preprogrammed with the same common key that the AP device and all other wireless enabled devices were preprogrammed with by their manufacturer or distributor. Examples of such a device is the new wireless device 504 of FIG. 5 and the new wireless device 604 of FIG. 6, which are to be respectively connected to the secure wireless networks established by AP devices 501 and 601. Since the new wireless devices 504 and 604 have been preprogrammed with the common SSIDs and common keys of their respective AP devices 501 and 601, they are shown in FIGS. 5 and 6 as being included as part of the self-configuring secure wireless networks 500 and 600, respectively, even though they were not part of the initial installation of the self-configuring secure wireless networks 500 and 600. Also, in this example, the authorized device is a mobile device, such as a smartphone. However, it is to be appreciated that any authorized device capable of establishing an Internet connection with the service provider server may be alternatively used.

FIG. 13 illustrates an example series of actions performed by a mobile device operated by a user to add a new WiFi enabled device to the secure wireless network. In block 1301, the mobile device establishes a connection with the service provider server through the Internet either through the home WiFi network as described in reference to blocks 902, 903, and 906 of FIG. 9 or using a wireless communication network such as 3G or 4G as described in reference to blocks 910 and 912 of FIG. 9. In block 1302, the mobile device requests activation of a new wireless device to the service provider server. In block 1303, the mobile device provides the unique identifier such as a serial number of the new wireless device to the service provider server in the same manner as it provides the unique identifier of the AP device as described in reference to block 907 of FIG. 9. In block 1304, the mobile device receives confirmation from the service provider server after the new wireless device has been successfully activated.

FIG. 14 illustrates an example series of actions performed by a service provider server such as server 110 in FIGS. 5 and 6. In block 1401, the service provider server receives a request from an authorized device, such as mobile devices 131, 132 of FIGS. 5 and 6, to add a new wireless enabled device to an established secure wireless network, which the authorized device is authorized to request data from and/or control resources of Prior to making such request, however, the new wireless device should be powered on and physically located within operating distance to the AP device of the secure wireless network.

In block 1402, the service provider server makes a determination whether or not the new wireless device may be added to the secure wireless network. To do this, the service provider server requests, if it hasn't already been provided, the device's unique identifier and confirms its validity as a proper serial number. If the determination in block 1402 is NO, the service provider server sends a warning message back to the authorized device to notify its user that the device cannot be added.

On the other hand, if the determination in block 1402 is YES, then in block 1403, the service provider server next determines whether the associated AP device, i.e., the AP device to which the new wireless device is to be wirelessly connected to, is on-line at the time, i.e., a connection currently exists between the AP device and the service provider server. If the determination in block 1403 is NO, then the service provider server sends a warning message back to the authorized device to make sure the AP device is connected to an Internet gateway and is powered up.

If the determination in block 1403 is YES, then in block 1404, the request to add the new wireless device to the established secure wireless network is relayed to the AP device. In block 1405, the service provider server periodically checks whether the AP device has successfully added the new wireless device to its secure wireless network. If the determination in block 1405 is still NO after a specified period of time, in block 1406, the service provider server sends a warning message back to the authorized device to notify its user that the request to add the new wireless device has failed. The warning message may also provide a recommendation that the user make sure that the new wireless device is powered on and within operating distance to the AP device before trying again to add the new wireless device in another request to do so.

If the determination in block 1405 is YES within the specified period of time, the service provider server then adds information of the newly added wireless device to a list of resources available on the secure wireless network and notifies the requesting authorized device that a successful addition of the new wireless device to the secure wireless network has been completed.

FIG. 15 illustrates an example series of actions performed by the AP device to add a new wireless enabled device to an established secure wireless network in a home security system. In this example, it is assumed that the secure wireless network has been previously established using a new key, not using the preprogrammed common key.

In block 1501, the AP device receives the request to add the new wireless enabled device from the service provider server. Since the new wireless enabled device has been confirmed by the service provider server as being valid, the new wireless device may be presumed to have been pre-programmed with the same common key that was provided in the AP device's self-configuring secure wireless network. In this example, the common key is the default key to simplify the description.

In block 1502, the AP device then re-establishes the secure wireless network using the common key, which has been permanently stored in memories of the network devices. Since the new wireless enabled device has also been prepro-gramed with the common key, it is now added to the re-established secure wireless network. In block 1503, the AP device then shares the new key, which it has stored in its memory, with all devices on the secure wireless network, including the new wireless enabled device, then re-establishes the secure wireless network using the new key. In block 1504, the AP device then determines whether the new wireless device has been connected to the re-established secure wireless network. If the determination in block 1504 is NO, then in block 1505, the AP device sends a warning message back to the service provider server, which in turn, may relay the warning message back to a requesting authorized device, e.g., a mobile device operated by a user. If the determination in block 1504 is YES, then in block 1506, the AP device sends a success message back to the service provider server, which in turn, may relay the success message back to the requesting authorized device.

As an alternative to the above described method for activating a new wireless device, if the user desires to connect the new wireless device without going through the service provider server, the user may simply press reset buttons on the AP device and all wireless enabled network devices currently connected to the AP device so that their current keys are either erased or otherwise preempted by the preprogrammed common key. The user may then power down all devices, then power back up all wireless enabled network devices to be connected to the AP device, and finally power back up the AP device so that it may re-establish the secure wireless network using the common key originally programmed in all the devices. In this way, the new wireless device is included along with the wireless enabled devices previously connected to the AP device.

Alternatively, rather than performing a power down/up cycle, the depressing of the reset buttons may automatically power down and power back up their respective devices after the devices have reset the wireless network key back to the preprogrammed common key. A software agent installed on the AP device at the time of its initial configuration may then cause the AP device to identify the newly added wireless device (along with all other wireless enabled devices that have reset their respective wireless network keys as described above), retrieve the unique identifier from the newly added wireless device, and transmit the retrieved unique identifier to the service provider server to activate the new wireless device in a manner as previously described. After successful activation of the newly added wireless device, the service provider server may then command the AP device to re-establish the secure wireless network using the previously preempted new key or a different new key, which may be generated by either the service provider server or the AP device as previously described.

Figure 16:
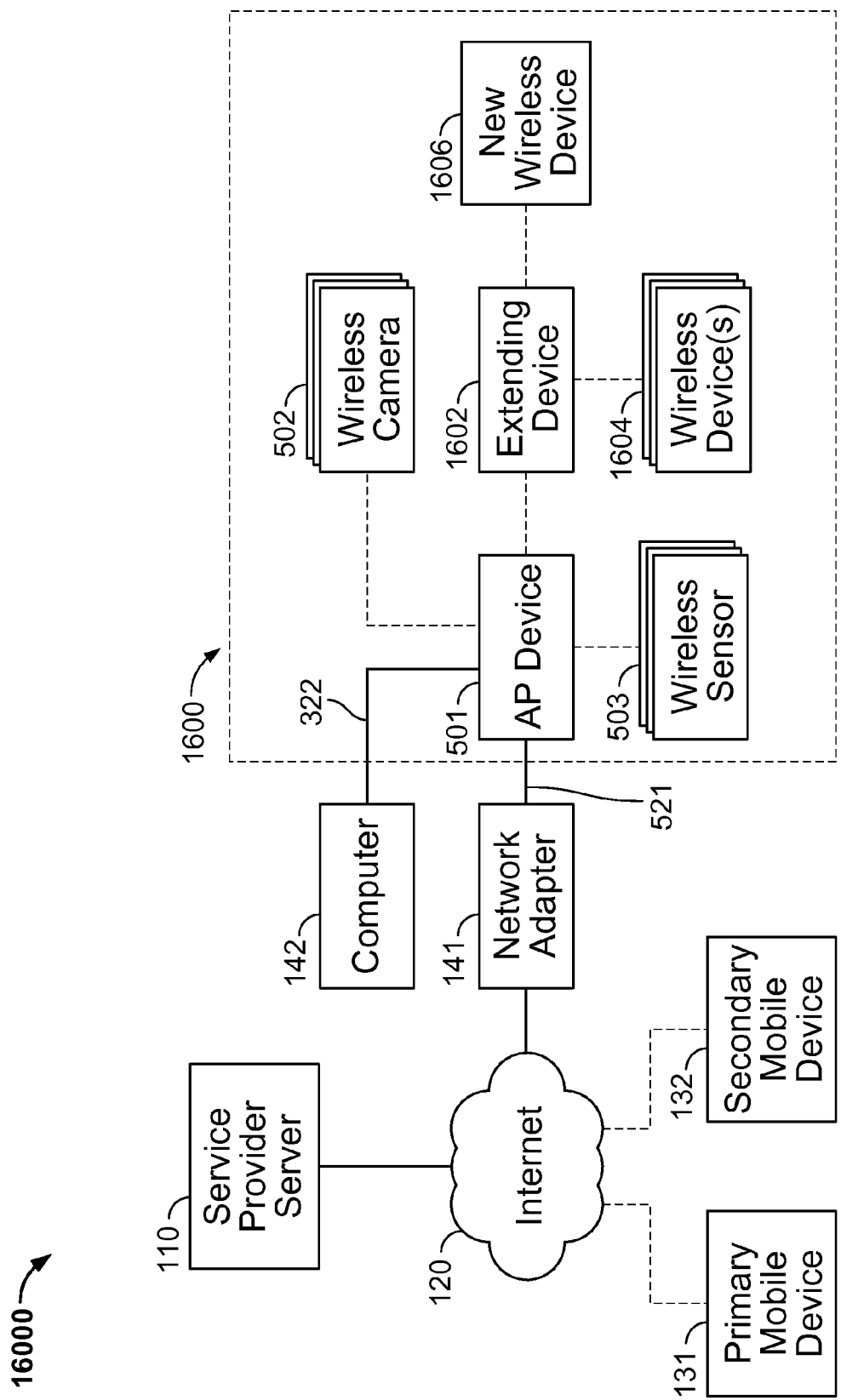
FIG. 16 illustrates a block diagram of an example system including a self-configuring secure wireless network including one or more network extenders, utilizing aspects of the present invention.

FIG. 16 illustrates a block diagram of an example system 16000 including a self-configuring secure wireless network 1600 including a network extender 1602. The self-configuring secure wireless network 1600 is connected through the internet 120 to a service provider server 110. The self-configuring secure wireless network 1600 includes an Access Point (AP) device 501 and wireless enabled devices 502, 503, which have been preprogrammed with a common key so that upon powering up the devices, the AP device 501 establishes a secure wireless network using the common key as described above.

In a typical home security system, several strategically positioned cameras 502 and sensors 503 may be included. In addition to sensors included for security purposes such as movement and displacement sensors, for example, detecting the opening of doors and windows, other sensors providing other useful information may be included such as doorbell sensors, smoke detector alarm sensors, temperature sensors, and/or environmental control sensors and/or controls.

However, the AP device 501 has a limited range. As a result, one or more wireless enabled devices may not be within range of the AP device 501. At least one extending device 1602 can be used to extend the range of the secure wireless network 1600 such that additional wireless enabled devices can be added. The extending device 1602 can be wireless bridge or repeater device. The wireless bridge is used to connect two or more network segments that are physically and/or logically separated. The extending device 1602 can be, for example, a wireless router or wireless access points that offers either a "bridge" mode or a "repeater" mode. The extending device 1602 can be preprogrammed with a common key so that upon powering up the devices, the AP device 501 incorporates the extending device 1602 into the self-configuring secure wireless network 1600 using the common key, e.g., as previously described.

One or more wireless enabled devices 1604, e.g., wireless cameras and/or sensors, are coupled to the AP device 501 through the extending device 1602. Without the extending device 1602, the one or more wireless enabled devices 1604 would be unable to communicate with the AP device 501.

An additional wireless device 1606 is also shown, which has been subsequently added to the secure wireless network 1600 after the installation of the secure wireless network 1600 in the home security system. Hence, it is referred to as being a "new" wireless device. The additional wireless device 1606 is positioned within the extended range of the secure wireless network 1600 provided by the extending device 1602. Similar to the wireless enabled devices 502, 503, the new wireless device 1606 has also been preprogrammed with the common key so that it too can provide for self-configuration of the secure wireless network 1600.

The AP device 501 can include at least one of an Ethernet receptacle or Universal Serial Bus (USB) receptacle so that various devices such as computer 142 may be wire-connected to it, such as through an Ethernet connection 522. The AP device 501 can be configured to be in router mode. Hence, it can be referred to as being a "router" access point device.

The AP device 501 is wire-connected, such as through an Ethernet connection 521, to a network adapter 141, e.g., a modem, which accesses the Internet 120 through an ISP. Preferably, a broadband connection is used for high speed transmission of video data from the wireless camera 502 and sensor data from the wireless sensor 503. The AP device 501 includes a Dynamic Host Configuration Protocol (DHCP) server which is enabled in this case so that it may assign IP subaddresses to devices connecting through the AP device 501 to the Internet 120.

As previously explained, the AP device 501 has a software agent residing in it that automatically establishes a connection with a remote service provider server 110 upon the AP device 501 being powered up and after it has been connected to the Internet 120 through the network adapter 141, which serves as an Internet gateway. The service provider server 110 interacts with the AP device 501 and authorized devices, such as primary and secondary mobile devices 131, 132, to perform various functions and/or services as described herein.

The mobile devices 131, 132 preferably also have software agents or resident applications for such interaction with the service provider server 110. Devices that are attempting to interact with the service provider server 110 may confirm their authority to the service provider server 110, for example by providing information that uniquely identifies the requesting device, such as an Internet Protocol (IP) address, a product serial number, or a cell phone number. Alternatively, they may provide a user name and password which are authorized to interact with the self-configuring secure wireless network 1600. To facilitate such authorization procedures, the service provider server 110 stores or has ready access to such authorization information for each self-configuring secure wireless network of users who subscribe to the service.

The cameras 502 and sensors 503 can be configured as part of the self-configuring secure wireless network 1600 as described above. Additionally, the extending device 1602 can also be configured at startup. In particular, the extending device 1602 is coupled to the AP device 501 in a similar manner as the cameras 502 and sensors 503 above.

Once the extending device 1602 is coupled to the AP device 501, the one or more wireless enabled devices 1604 is added to the self-configuring secure wireless network 1600 as described above, but using the extending device 1602 to relay communications between the AP device 501 and the one or more wireless enabled devices 1604.

In as similar manner as described previously, the AP device 501 is configured to update the wireless devices including the extending device 1602 and the one or more wireless enabled devices 1604, with a new key. The new key can be generated by the AP device 501 or received from the service provider server 110. The new key can uniquely identify a user of the wireless network 1600 and can be derived using one or more unique user identifiers, such as one or more of a user telephone number, address, email address, social security number, driver's license number, or credit card number. The wireless network 1600 is re-established using the new key, which replaces the common key.

If a new wireless enable device, having the common key, is added to the wireless network 1600 at a later point in time, the AP device 501 can first re-establish the wireless network using the common key, add the new wireless enabled device to the wireless network, and then re-establish the wireless network using the new key as described above.

Additionally, the AP device 501 and subsequently use one or more updated keys, e.g., additional new keys to update the wireless network 1600. Each key can be distinct. For each updated keys, the AP device 501 distributes the updated key to each wireless enabled device in the wireless network 1600. The wireless network 1600 is re-established using the updated key.

Additional extending devices can be added, e.g., in a cascading manner or to extend the network in different directions independently. However, if only a first extending device is initially in range of the AP, the first extending device is initially added to the self-configuring wireless network. Once the first extending deice is added, subsequent extending devices can be sequentially added in a similar manner as the range of the self-configuring secure wireless network is extended.

The additional wireless device 1606, added after the initial configuration of the self-configuring secure wireless network 1600 in a similar manner as described above. Additionally, as described above, a new key can be generated and distributed to devices in the self-configuring secure wireless network 1600.

Although the various aspects of the present invention have been described with respect to a preferred embodiment, it will be understood that the invention is entitled to full protection within the full scope of the appended claims.

What is claimed is:

1. A self-configuring wireless system comprising:
a plurality of wireless network devices, wherein each of the plurality of wireless network devices is preconfigured with a common default Wi-Fi key; and
an access point device configured to establish a secure wireless network that communicatively couples each of the plurality of wireless network devices without user intervention, wherein the access point device is preconfigured with the common default Wi-Fi key;
wherein the access point device establishes a secure wireless network with the plurality of network devices using the common default Wi-Fi key upon powering up the access point device, and
wherein the access point device is further configured to update each of the plurality of wireless network devices with a first new Wi-Fi key distinct from the common default Wi-Fi key and to re-establish the secure wireless network using the first new Wi-Fi key common to the plurality of wireless devices.

2. The self-configuring wireless system of claim 1, wherein the access point device is configured to automatically establish communication with a remote service provider device.

3. The self-configuring wireless system of claim 1, wherein the first new Wi-Fi key is received from a remote service provider device, the first new key uniquely identifying a user and derived using one or more unique user identifiers, the user identifiers including one or more of a user telephone number, address, email address, social security number, driver's license number, or credit card number.

4. The self-configuring wireless system of claim 1, wherein the access point device is configured to generate the first new Wi-Fi key using a unique identifier of the access point device.

5. The self-configuring wireless system of claim 1, wherein the access point device is configured to receive a second new Wi-Fi key after previously receiving the first new Wi-Fi key and to share the second new Wi-Fi key with the plurality of wireless network devices so that the second new Wi-Fi key is usable instead of the first new Wi-Fi key to establish the wireless network.

6. The self-configuring wireless system of claim 1, wherein a new wireless network device is preconfigured with the common default Wi-Fi key, and wherein the access point device is configured to receive an indication to add the new wireless network device to an established wireless network by:
re-establishing the wireless network using the common default Wi-Fi key to add the new wireless network device to the re-established wireless network;
sharing the first new Wi-Fi key with at least the new wireless network device; and
re-establishing the wireless network using the first new Wi-Fi key.

7. The self-configuring wireless system of claim 1, wherein the access point device is preconfigured to be in bridge mode and to assign one or more addresses to each at least one wireless network device.

8. The self-configuring wireless system of claim 1, wherein the common default Wi-Fi key uniquely identifies a user.

9. The self-configuring wireless system of claim 1, wherein the access point device is configured to communicate with the plurality of wireless network devices using one of a WiFi, Bluetooth, Z-Wave, ZigBee, and 433 mhz RF wireless network protocol.

10. A service provider system comprising:
an Internet gateway for accessing the Internet; and
a server computer configured to establish a connection through the Internet with an access point device associated with a wireless network including a plurality of wireless network devices and a mobile device of a user associated with the access point device,
wherein the server computer is further configured to generate a first new Wi-Fi key derived from information of the user associated with the access point device, and to transmit the first new Wi-Fi key to the access point device so that the access point device may re-establish a wireless network using the first new Wi-Fi key in place of a prior default Wi-Fi key common to the access point device and the plurality of wireless network devices.

11. The service provider system of claim 10, wherein the server computer is configured to periodically generate a second new Wi-Fi key derived from information of the user associated with the access point device and transmit the second new Wi-Fi key to the access point device so that the access point device may re-establish a secure wireless network using the second new Wi-Fi key.

12. The service provider system of claim 10, wherein the first new Wi-Fi key is generated using unique user information including one or more unique user identifiers, the user identifiers including one or more of a user telephone number, address, email address, social security number, driver's license number, or credit card number.

13. The service provider system of claim 12, wherein the one or more unique user identifiers are obtained from a user account associated with the wireless network.

14. A method comprising:
using an access point device to establish a secure wireless network that communicatively couples each of a plurality of wireless network devices without user intervention, wherein the access point device and each of the plurality of wireless network devices are preconfigured with the common default Wi-Fi key;
updating each of the plurality of wireless network devices with a first new Wi-Fi key distinct from the common default Wi-Fi key and to re-establish the secure wireless network using the first new Wi-Fi key common to the plurality of wireless devices;
receiving a request to add a new wireless enabled device to the wireless network, wherein the new wireless enabled device is preprogrammed with the common default Wi-Fi key;
re-establishing the wireless network using the common default Wi-Fi key to add the new wireless enabled device to the re-established wireless network;
sharing the first new Wi-Fi key with the new wireless enabled device; and
re-establishing the wireless network using the first new Wi-Fi key.

15. A method comprising:
using an access point device to establish a secure wireless network that communicatively couples each of a plurality of wireless network devices without user intervention, wherein the access point device and each of the plurality of wireless network devices are preconfigured with the common default Wi-Fi key;
generating a new Wi-Fi key so as to be derived from information of a user associated with an access point device, wherein the information includes one or more of the user's telephone number, social security number, driver's license number, or credit card number; and
transmitting the new Wi-Fi key to the access point device so that the access point device may re-establish a wireless network using the new Wi-Fi key.

16. A system comprising:
an access point device configured to establish a secure wireless network that communicatively couples each of the plurality of wireless network devices without user intervention, wherein the access point device is preconfigured with a common default Wi-Fi key;
a plurality of wireless network devices, wherein each of the plurality of wireless network devices is preconfigured with the common default Wi-Fi key; and
a first extending device configured to extend a range of the wireless network such that the access point device establishes the secure wireless network with one or more of the plurality of wireless network devices through the first extending device, the first extending device being preconfigured with the common default Wi-Fi key,
wherein the access point device is further configured to update each of the plurality of wireless network devices and the first extending device with a first new Wi-Fi key distinct from the common default Wi-Fi key and to re-establish the secure wireless network using the first new Wi-Fi key common to the plurality of wireless devices.

17. The system of claim 16, wherein the first extending device is a wireless repeater or bridge device.

18. The system of claim 16, wherein the first extending device allows each of the plurality of wireless network devices to communicate with the access point device.

19. The system of claim 16, wherein the first new Wi-Fi key is received from a remote service provider device, the first new Wi-Fi key uniquely identifying a user and derived using one or more unique user identifiers, the user identifiers including one or more of a user telephone number, address, email address, social security number, driver's license number, or credit card number.

20. The system of claim 16, wherein the access point device is configured to generate the first new Wi-Fi key using a unique identifier of the access point device.

21. The system of claim 16, wherein the access point device is configured to receive a second new Wi-Fi key after previously receiving the first new Wi-Fi key and to share the second new Wi-Fi key with the one or more wireless network devices and the first extending device so that the second new Wi-Fi key is usable instead of the first new Wi-Fi key to establish the wireless network.

22. The system of claim 16, further comprising one or more additional wireless network devices positioned such that they can directly communicate with the access point device.

23. The system of claim 16, further comprising a second extending device, wherein the first extending device and the second extending device extend a range of the access point device.

* * * * *